(12) United States Patent
Krumm et al.

(10) Patent No.: US 9,176,485 B2
(45) Date of Patent: Nov. 3, 2015

(54) OCCUPANCY PREDICTION USING HISTORICAL OCCUPANCY PATTERNS

(75) Inventors: John Charles Krumm, Redmond, WA (US); James W. Scott, Cambridge (GB); Alice Jane Bernheim Brush, Bellevue, WA (US); Brian R. Meyers, Issaquah, WA (US); Stephen Edward Hodges, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 297 days.

(21) Appl. No.: 13/151,849

(22) Filed: Jun. 2, 2011

(65) Prior Publication Data

US 2012/0310376 A1 Dec. 6, 2012

(51) Int. Cl.
*G05B 13/04* (2006.01)
*G05B 15/02* (2006.01)
*G06N 7/00* (2006.01)

(52) U.S. Cl.
CPC ............... *G05B 15/02* (2013.01); *G06N 7/005* (2013.01); *G05B 2219/2642* (2013.01)

(58) Field of Classification Search
CPC ... F24F 11/34; F24F 2011/75; F24F 2011/36; G05B 15/02
USPC ..................................................... 706/14, 45
See application file for complete search history.

(56) References Cited

U.S. PATENT DOCUMENTS

| | | | |
|---|---|---|---|
| 6,711,253 B1 * | 3/2004 | Prabhaker ................. | 379/265.01 |
| 7,493,369 B2 | 2/2009 | Horvitz et al. | |
| 7,538,690 B1 | 5/2009 | Kaplan et al. | |
| 7,779,241 B1 | 8/2010 | Dunn et al. | |
| 2004/0128066 A1 | 7/2004 | Kudo et al. | |
| 2008/0313128 A1 * | 12/2008 | Arasu et al. ........................ | 707/2 |
| 2010/0019051 A1 * | 1/2010 | Rosen ........................... | 236/46 R |
| 2010/0235004 A1 | 9/2010 | Thind | |
| 2010/0250481 A1 | 9/2010 | Tomastik | |
| 2011/0085200 A1 * | 4/2011 | Marunouchi ................. | 358/1.15 |
| 2012/0033716 A1 * | 2/2012 | Hoang et al. .................. | 375/150 |
| 2012/0065783 A1 * | 3/2012 | Fadell et al. ................... | 700/276 |

(Continued)

OTHER PUBLICATIONS

Monreale et al., WhereNext: a Location Predictor on Trajectory Pattern Mining, KDD '09, Jun. 28-Jul. 1, 2009, Paris, France.*

(Continued)

*Primary Examiner* — Kakali Chaki
*Assistant Examiner* — Michael Zidanic
(74) *Attorney, Agent, or Firm* — Steve Wight; Judy Yee; Micky Minhas

(57) ABSTRACT

Methods and systems for occupancy prediction using historical occupancy patterns are described. In an embodiment, an occupancy probability is computed by comparing a recent occupancy pattern to historic occupancy patterns. Sensor data for a room, or other space, is used to generate a table of past occupancy which comprises these historic occupancy patterns. The comparison which is performed identifies a number of similar historic occupancy patterns and data from these similar historic occupancy patterns is combined to generate an occupancy probability for a time in the future. In an example, time may be divided into discrete slots and binary values may be used to indicate occupancy or non-occupancy in each slot. An occupancy probability for a defined future time slot then comprises a combination of the binary values for corresponding time slots from each of the identified similar occupancy patterns.

20 Claims, 8 Drawing Sheets

(56) References Cited

U.S. PATENT DOCUMENTS

2012/0066168 A1* 3/2012 Fadell et al. .................. 706/52
2012/0191465 A1* 7/2012 Xue et al. ..................... 705/2

OTHER PUBLICATIONS

Alrazgan, et al., "Learning Occupancy Prediction Models with Decision-Guidance Query Language", retrieved at <<http://ieeexplore.ieee.org/stamp/stamp.jsp?tp=&arnumber=5718556>>, Proceedings of the 44th Hawaii International Conference on System Sciences, Jan. 2011, pp. 10.

Jolliffe, Ian, "Statistical Models for Probabilistic Forecasting", Retrieved at <<http://www.google.co.in/url?sa=t&source=web&cd=9&ved=0CFUQFjAI&url=http%3A%2F%2Fwww.isse.ucar.edu%2Fams%2Fpresent%2Fjolliffe.ppt&ei=cv11Ta-YN8KxhAfG5O2RBw&usg=AFQjCNGL6FACqPIsajLqIESOUiEY4Kp2zw>>, Jan. 9, 2005, pp. 36.

Horvitz, et al., "Coordinate Probabilistic Forecasting of Presence and Availability", Retrieved at <<http://research.microsoft.com/en-us/um/people/horvitz/Coordinate.htm>>, Proceedings of the Eighteenth Conference on Uncertainty and Artificial Intelligence, Edmonton, Alberta, Jul. 2002. Morgan Kaufmann Publishers, pp. 224-233. pp. 10.

Gupta, et al., "Adding GPS-Control to Traditional Thermostats: An Exploration of Potential Energy Savings and Design Challenges", Retrieved at <<http://web.media.mit.edu/~intille/papers-files/GuptaIntilleLarson09.pdf>>, Pervasive '09 Proceedings of the 7th International Conference on Pervasive Computing, 2009, pp. 18.

Krumm, et al., "Learning Time-Based Presence Probabilities", Retrieved at <<http://research.microsoft.com/en-us/um/people/jckrumm/Publications%202011/Learning%20Time-Based%20Presence%20Probabilities%20-%20camera%20ready%2001.pdf>>, Ninth International Conference on Pervasive Computing, vol. 6696, Jun. 12-15, 2011, pp. 18.

* cited by examiner

OCCUPANCY PREDICTION USING HISTORICAL OCCUPANCY PATTERNS

BACKGROUND

The efficiency of home heating solutions could be improved if it was possible to accurately predict when the home, or a part of the home, was going to be occupied. Existing home heating systems are typically programmable, allowing a user to specify two periods of the day when the heating is on (e.g. morning and evening). Irrespective of whether the home is occupied or not, the home will still be heated to the set point temperature set on a thermostat. Intelligent thermostats are available, so that the set point temperature can be varied at different times of day; however, these are often not programmed by users and again they do not address whether the home is occupied or not. A solution which has previously been proposed uses a person's location to predict the minimum time in which they could arrive home: if a person is an X minute drive time from their home, the person could be home in X minutes.

The embodiments described below are not limited to implementations which solve any or all of the disadvantages of known occupancy prediction methods or to home heating applications.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present a selection of concepts disclosed herein in a simplified form as a prelude to the more detailed description that is presented later.

Methods and systems for occupancy prediction using historical occupancy patterns are described. In an embodiment, an occupancy probability is computed by comparing a recent occupancy pattern to historic occupancy patterns. Sensor data for a room, or other space, is used to generate a table of past occupancy which comprises these historic occupancy patterns. The comparison which is performed identifies a number of similar historic occupancy patterns and data from these similar historic occupancy patterns is combined to generate an occupancy probability for a time in the future. In an example, time may be divided into discrete slots and binary values may be used to indicate occupancy or non-occupancy in each slot. An occupancy probability for a defined future time slot then comprises a combination of the binary values for corresponding time slots from each of the identified similar occupancy patterns.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
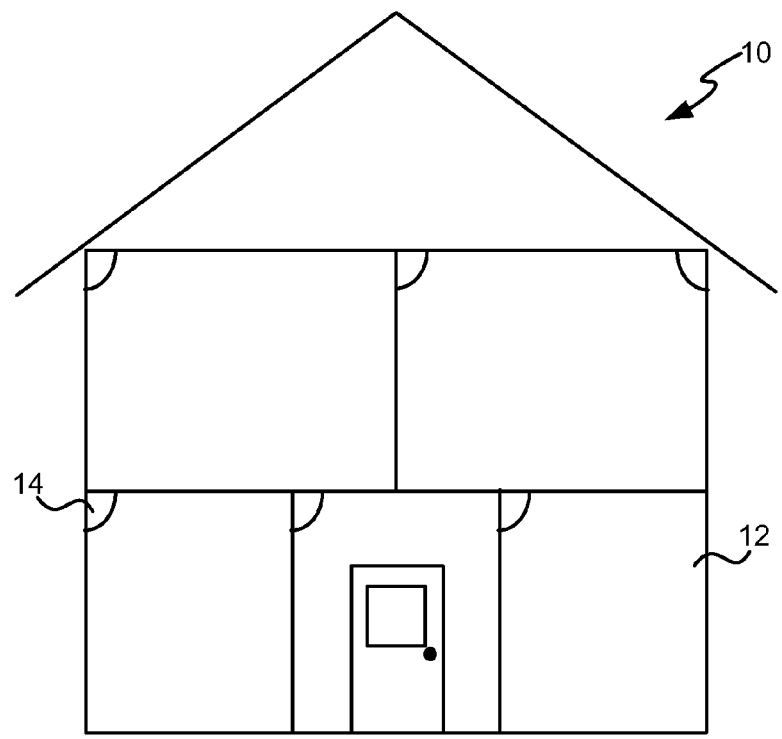
FIG. 1 shows a schematic diagram of a building and a flow diagram of an example method of predicting occupancy in the building based on historical occupancy patterns.
Figure 1:
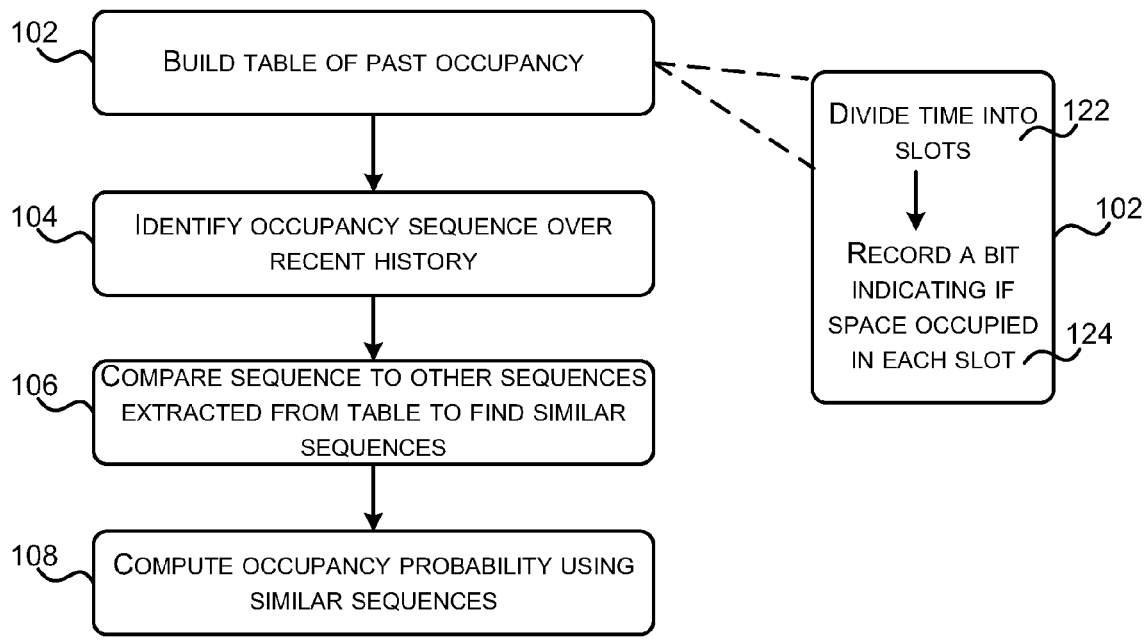

FIG. 1 shows a schematic diagram 10 of a building, such as a home, in which occupancy is predicted based on historical occupancy patterns, as shown in the example flow diagram 100. The building comprises one or more spaces 12 with one or more occupancy sensors 14 associated with each space 12. In one example, the whole house may be considered a single space and there may be a single sensor (e.g. located in the entrance hall). In another example, each room may be considered a separate space and there may be an occupancy sensor in each room. In a further example, only some of the rooms in the building may be considered.

Figure 2:
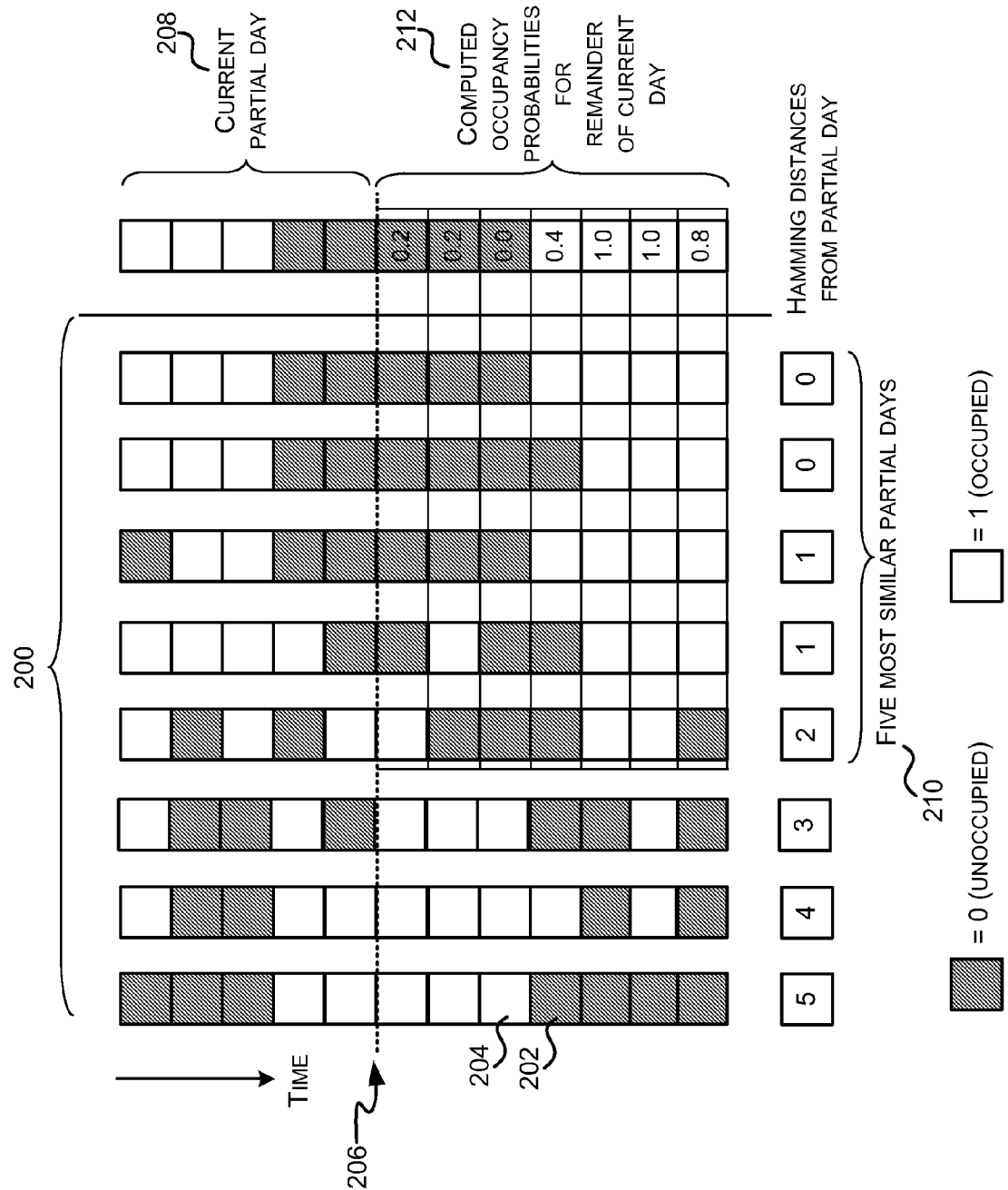
FIG. 2 is a graphical representation of occupancy data and occupancy patterns used in predicting occupancy in a building.

As shown in the flow diagram 100, occupancy prediction is performed by building a table (or database) of past occupancy (block 102) and an example of such a table 200 is shown in FIG. 2. This table is built using data from the sensors 14, as described in more detail below. In the example shown, a black square 202 indicates a period of time when a space is unoccupied and a white square 204 indicate a period of time when the space is occupied. In order to predict future occupancy at a time, t (as indicated by the horizontal dotted line 206 in FIG. 2), an occupancy sequence 208 over recent history is identified (block 104) and in the example shown this occupancy sequence 208 over recent history comprises the occupancy pattern for day so far (e.g. from midnight until time t). The identified occupancy sequence 208 is compared to other sequences extracted from the table 200 to find similar occupancy sequences (block 106).

In the example shown in FIG. 2, the five most similar occupancy sequences 210 are identified by comparison of the occupancy of corresponding time periods in the current day and past days in the identified occupancy sequence 208 over recent history and in each of the sequences extracted from the table of past occupancy 200. In the example shown, the identified similar occupancy sequences are referred to as 'partial days'. This is because in this example each sequence comprises occupancy data for a day (which may be augmented with additional data, as described below) and the comparison (in block 106) only relates to data for part of that day. As shown in FIG. 2, each of the similar sequences which are found by performing the comparison (in block 106) is longer than the identified occupancy sequence 208 (e.g. each of the similar sequences comprises occupancy data which includes occupancy data for time periods which correspond to a time after time t), and it is this extra data which is used to calculate an occupancy probability for the future 212, i.e. time after time t, (block 108). Each of these steps is described in more detail below.

Any type of occupancy sensor may be used to detect whether there is anyone in a space in order to build a table of past occupancy (in block 102). In an example system, the occupancy of a space is monitored and the data used to generate both the table of past occupancy 200 and the sequence over recent history 208. In fact, the sequence over recent history may be incorporated into the table of past occupancy since, by definition, recent history forms part of the historical occupancy data for that space. Examples of suitable sensors include, but are not limited to, motion sensors, RFID readers, light sensors, humidity sensors (e.g. for detection of increased humidity in a bath or shower room), depth cameras, thermal cameras, computer vision systems, accelerometers (e.g. to detect user movement or sleep patterns), microphones, receivers for detecting the presence of mobile devices (e.g. for detection of mobile phones, Bluetooth® devices, WiFi devices, etc), vibration sensors, pressure sensors, utility usage sensors (e.g. for measuring use of electricity, gas or water), location sensors (e.g. GPS) etc. Some of these sensors measure occupancy directly (e.g. motion sensors) whilst others are used to infer occupancy based on sensor data (e.g. if humidity increases in a bathroom, it is inferred that there is someone in the bathroom washing or if a light is on in a room after dark, as detected by a light sensor, it is inferred that someone is in that room). It will be appreciated that some sensors may be located within the space they are monitoring (e.g. a motion sensor or humidity sensor) and others may be located outside the space they are monitoring (e.g. a utility usage sensor may be located within a utility meter cupboard, attic space, close to a utility meter on an outside wall etc). In some spaces there may be more than one sensor and these sensors may be of the same or different types.

Although the majority of the description herein refers to sensors installed in spaces which detect the user, many of the sensors may alternatively be carried by the user to detect when they are in a particular space (e.g. when they are home) and the methods described herein are also applicable to such implementations. In an example, a sensing module may be located on a home network to determine whether a user's phone (or other module device) is associated with a wireless access point (which may be a WiFi base station) or not.

Where the sensors generate events at discrete points in time (e.g. RFID sensors or motion sensors), periods of occupancy may be derived by filling in gaps between two sensed events with a certain time difference (e.g. 2 minutes for RFID, 5 minutes for motion sensing during the day, 30 minutes for motion sensing during pre-defined sleep hours). For example, where occupancy is detected at 10:01 and 10:03 by an RFID sensor, it is assumed that the space was occupied in the intervening period. If however, occupancy was detected at 10:05 and then not again until 11:05, it may be assumed that the space was unoccupied during the intervening period. Such thresholds may be statically set or dynamically determined. For example, if a whole-house RFID sensor indicates that someone is at home, but the only sensor firing is the living room sensor, and it hasn't fired for 45 minutes, the threshold might automatically be temporarily adjusted to 1 hour. Any such adjustment may be based on additional data about building layout, e.g. a floor plan, which may, in the previous example, show that the occupant cannot possibly have left the house from the living room.

In some examples, other data may be used instead of or in addition to sensor data, to generate the table of past occupancy. An example of such other data is calendar data from an electronic calendar application such as Microsoft® Office Outlook®. Where a person is shown at an event in a particular space at a particular time, they may be assumed to be occupying that space and where a person is shown at an event in another place, it may be assumed that the particular space is unoccupied. For times in the calendar where their location is not specified, an algorithm may be used to determine whether a particular space is occupied or not (e.g. if a person is not shown as being away from home during the hours of 2300 to 0700, it may be assumed that they are at home and it may further be assumed that they are in the bedroom sleeping).

Some of the sensors listed above identify any person in a space (e.g. whether a space is occupied or not) but other sensors may be able to identify which person is in a space (e.g. whether a space is occupied by person A, occupied by person B or not occupied). In order to identify a particular person, some of the sensors require users to carry a special device (e.g. an RFID tag) and others do not impose any behaviors on the users (e.g. computer vision systems or systems using electronic calendar data). In some examples, a person may be specifically identifiable (e.g. as 'John Smith' for example) and in other examples, a person may be identifiable using an identifier (e.g. 'Person 12') but not by name. In an example, the home may be considered a single space and each person with keys to the home may be given an active, semi-passive or passive RFID tag to place on their key ring (or otherwise co-locate with their keys). An RFID reader (or a number of RFID readers) located in the home can then detect which occupants have left their keys in the home (or nominated place within the home, dependent upon the range of the RFID readers and tags used) and which occupants have removed their keys from the home and using this data, determine which people are in the house at any point in time. Although such a system may result in some errors (e.g. when a user forgets their keys when they go out), it will still be possible to generate a relatively accurate occupancy prediction. In other examples, sensor data may enable per-person occupancy to be detected based on other characteristics (e.g. clothing worn, approximate height or build, tracking the person's motion around the home, etc) and in an example such characteristics may be detected using a thermal imaging system or a vision system without sufficient resolution to identify facial features. In such examples a person may not be globally identifiable such that person A is always identified as person A (as in the examples given previously), but instead, the association may be more short-term (e.g. occupancy of a person may be correlated to a session ID over a period when they are wearing the same clothes).

Where particular people are identifiable from the occupancy data (which may be sensor data), either in terms of a specific identifier (e.g. John Smith or Person A) or a more short-term session-like identifier (as described above), the occupancy prediction may be performed on a per-person basis. In such an example, the occupancy sequence identified in block 104 may relate to a particular person and then the comparison in block 106 may be performed with reference to historical occupancy sequences for that person. In another example, the occupancy prediction may be performed on the basis for occupancy relating to groups of people, e.g. when person A and person B are home at the same time.

As described above, the entire home may be considered as a single space for the purposes of this method or individual rooms may be monitored separately and the data recorded to build tables of past occupancy for each room. Although the following examples refer to the spaces being rooms in a home, this is by way of example only and the method may be applied to commercial spaces (e.g. offices), external spaces (e.g. gardens, courtyards, car parks etc), etc and the spaces monitored need not be in the same building or even geographically close to each other (e.g. a user may place a sensor in their workplace in addition to one or more sensors in their home).

In order to generate a table of past occupancy (in block 102), time may be divided into discrete slots or time intervals (block 122), as shown by the individual squares in FIG. 2. In an example, these slots may be 15 minutes in length, although other time slots (e.g. 30 minute slots) may alternatively be used and in some algorithms a progressive algorithm may be used which considers decreasing slot length when performing the comparison (in block 106). In other examples, the slots may be much shorter in time and in the extreme, each slot may be very short (e.g. 1 s or 1 ms) such that the data is substantially continuous with any quantization only being the result of the sampling rate of the sensors themselves. Use of coarser quantization, however, may reduce the amount of computation required to perform the comparison of occupancy sequences in block 106. In the example shown in FIG. 2, the time slots do not overlap (i.e. the end of one time slot corresponds to the start of the next time slot); however, in other examples, the time slots may overlap and/or there may be gaps between time slots.

Where quantized time slots are used (as shown in FIG. 2), a single bit value may be used to indicate whether a space is occupied or not during the time slot, e.g. a bit value of '1' if occupied and '0' if unoccupied (block 124). For example, the table of past occupancy for a space may be as shown below, where for purposes of display, data has been truncated:

| Time | Monday | Tuesday | Wednesday | Thursday | Friday | Saturday |
|------|--------|---------|-----------|----------|--------|----------|
| 0000 | 1 | 0 | 1 | 1 | 1 | 1 |
| 0015 | 1 | 0 | 1 | 1 | 1 | 1 |
| 0030 | 1 | 0 | 1 | 1 | 1 | 1 |
| 0045 | 1 | 0 | 1 | 1 | 1 | 1 |
| 0100 | 1 | 0 | 1 | 1 | 1 | 1 |
| 0115 | 1 | 0 | 1 | 1 | 1 | 1 |
| ... | ... | ... | ... | ... | ... | ... |
| 2330 | 0 | 1 | 1 | 1 | 0 | 0 |
| 2345 | 0 | 1 | 1 | 1 | 1 | 0 |

In another example, the table of past occupancy may comprise a series of occupancy vectors, with one element for each time slot and such vectors may be referred to as 'binary vectors'. Using the example shown in FIG. 2, the table may be represented by the following 8 occupancy vectors:

(0, 0, 0, 1, 1, 1, 1, 1, 0, 0, 0, 0)
(1, 0, 0, 1, 1, 1, 1, 1, 1, 0, 1, 0)
(1, 0, 0, 1, 0, 1, 1, 1, 0, 0, 1, 0)
(1, 0, 1, 0, 1, 1, 0, 0, 0, 1, 1, 0)
(1, 1, 1, 1, 0, 0, 1, 0, 0, 1, 1, 1)
(0, 1, 1, 0, 0, 0, 0, 0, 1, 1, 1, 1)
(1, 1, 1, 0, 0, 0, 0, 0, 0, 1, 1, 1)
(1, 1, 1, 0, 0, 0, 0, 0, 1, 1, 1, 1)

As described above, data for multiple spaces may be collated, for example, in the form of an occupancy matrix with a column or row corresponding to each space. In another example, a table may be compiled with each entry corresponding to a time slot and comprising a bit sequence, where the bits in the bit sequence relate to different spaces (e.g. different rooms in a house). Data for different users (where available) may be recorded in a similar way.

A single table of past occupancy may be created (in block 102) or there may be multiple tables. In an example, there may be different tables for different rooms and/or different tables for different people (where the sensor or other data can distinguish occupancy by particular people). In an example, in addition to, or instead of, tables for particular rooms, there may be tables for combinations of spaces. For example, where a house has a master bedroom and a master bathroom (which may also be referred to as an ensuite bathroom), these two spaces may be considered a composite space and a table may be built which shows occupancy in this pair of spaces with entries comprising two bits of data (i.e. the occupancy of the master bedroom and the occupancy of the master bathroom). In a further example, spaces may be aggregated together using Boolean operators such as AND, OR, XOR, NAND etc. In an example, the bathrooms in a house may be aggregated together using an OR operator, such that occupancy of any bathroom results in the aggregated bathroom space being indicated as 'occupied' within a table of past occupancy. In another example, spaces on the same floor in a building may be aggregated together using an OR operator to record any occupation of a particular floor. These groups of spaces which are aggregated together may be fixed and may be user specified. However, in some examples, the groups may be learned by the system based on the past occupancy data and machine learning techniques (e.g. by looking at correlations between occupancy patterns in different spaces).

Such Boolean operators (e.g. AND, OR etc) may also be used where there are multiple sensors in a single space (e.g. where the space is quite large and a single sensor cannot detect occupancy over the entire space) such that if occupancy is detected by any of the sensors in the space, the space is recorded as being occupied.

In an example implementation, detection of any occupancy within the time slot results in the slot being marked as 'occupied'. In other examples, however, there may be a threshold of occupancy which is required before the time slot is marked as 'occupied' rather than 'unoccupied'. In an example, the space may be required to be occupied for a minimum of 3 minutes from a 15 minute time slot to be considered occupied (where this minimum time may be required to be continuous, or just the cumulative total of occupation time during the time slot). In another example, the threshold may be defined in terms of a percentage of occupancy during the time slot (e.g. a space is considered occupied for a time slot if it was occupied a minimum of 8% of the time slot or for a continuous period exceeding 8% of the time slot). This may be used to distinguish situations where a person goes into a room briefly, for example to collect an item, from situations where a person actually spends significant time in the room. Different spaces may have different thresholds set or all spaces may operate according to the same threshold. Where thresholds are used, this may be a user configurable parameter or may be set by the system provider.

As described above, the occupancy sequence over recent history 208, which is identified (in block 104) in order to determine a prediction of future occupancy, may comprise the occupancy for the current day up to the current time (e.g. from midnight to time t, as indicated by the dotted line 206 in FIG. 2). In another example, the sequence over recent history may not run until the current time, but may run until the time that the most recent occupancy measurement was made or to the last time slot boundary. For example, where 15 minute time slots are used in the table of past occupancy (as generated in block 102), the sequence of recent history may also be quantized in 15 minute blocks and so the occupancy sequence identified in block 104 will finish at the last complete time slot prior to time t (e.g. at 10:15 if t=10:22 and the time slot boundaries are at 0, 15, 30 and 45 minutes past each hour). In many implementations, the same quantization may be used for both the table of past occupancy and sequence of recent occupancy history; however, there may be other implementations where this is not the case, e.g. where dynamic or progressive time slot sizes are used.

In order to improve the quality of predictions made soon after midnight in the examples described above (which use recent history from the same day up to the current time or close to the current time), the recent history may be extended back in time to include some occupancy history from the previous day. This may be done, for example, by specifying that a sequence over recent history starts at, for example, 20:00 hrs on the previous day and runs up to the current time (or most recent time of measurement). In these examples, the length of the sequence over recent history will depend upon the time t at which the prediction is made and may result in predictions improving throughout the day (even where the sequence starts before midnight and so includes some of the previous day). In another example, the occupancy sequence over recent history may comprise a fixed length of recent occupancy history, such as the previous 4 hour or 8 hour period, running up to the time t when the prediction is made or to the time when the most recent occupancy measurement was made (e.g. a time slot boundary), as described above.

Where, as described above, the sequence of recent history is extended backwards into the previous day by a defined amount (e.g. augmented by four hours at the start of the day), the sequences from the table of past history are similarly augmented (e.g. by adding four hours of occupancy data from the previous day to the start of the sequence for each day) for the purposes of performing the subsequent comparison of sequences (in block 106). In some examples, sequences of past occupancy history may be augmented (for the purpose of performing the comparison) at the end of the day (e.g. by 4, 8 or 24 hours or much longer), for example so that predictions can be made going forward for the desired period.

The following example table shows sequences (one sequence per column) extracted from a table of past occupancy where each sequence includes data from both the previous day and data from the following day, such that data is replicated in adjacent columns (i.e. the first few rows of a column correspond to the last few rows in the previous column and the last few rows of a column correspond to the first few rows in the next column) but for the purposes of display only, the data has been truncated. It will be appreciated, however, that in many implementations the data for a particular time slot will only be stored once (e.g. in a SQL table mapping time slots to occupancy) and the sequences identified (or extracted) from the table using overlapping queries.

| Time | Monday | Tuesday | Wednesday | Thursday | Friday | Saturday |
|------|--------|---------|-----------|----------|--------|----------|
| 2000 | 1 | 0 | 1 | 1 | 1 | 0 |
| ... | ... | ... | ... | ... | ... | ... |
| 2330 | 1 | 0 | 1 | 1 | 1 | 0 |
| 2345 | 1 | 0 | 1 | 1 | 1 | 1 |
| 0000 | 1 | 0 | 1 | 1 | 1 | 1 |
| 0015 | 1 | 0 | 1 | 1 | 1 | 1 |
| 0030 | 1 | 0 | 1 | 1 | 1 | 1 |
| 0045 | 1 | 0 | 1 | 1 | 1 | 1 |
| 0100 | 1 | 0 | 1 | 1 | 1 | 1 |
| 0115 | 1 | 0 | 1 | 1 | 1 | 1 |
| ... | ... | ... | ... | ... | ... | ... |
| 2330 | 0 | 1 | 1 | 1 | 0 | 0 |
| 2345 | 0 | 1 | 1 | 1 | 1 | 0 |
| 0000 | 0 | 1 | 1 | 1 | 1 | 0 |
| 0015 | 0 | 1 | 1 | 1 | 1 | 1 |
| ... | ... | ... | ... | ... | ... | ... |
| 0345 | 0 | 1 | 1 | 1 | 1 | 1 |

As described above, the table of past occupancy may be stored in the form of a vector (e.g. a binary vector) and where this is done, the occupancy sequence over recent history may also be in the form of a vector. Such a vector may be referred to as a 'partial occupancy vector' because it contains no data for times after time t.

It will be appreciated that any reference to sequences relating to a particular day is by way of example only and in other examples, a different granularity of sequences may be used. In other examples, the occupancy sequence over recent history (identified in block 104) may relate to occupancy over the preceding week, two days, four hours etc. In another example, weekends may be considered together as a pair of days.

As described above and shown in FIGS. 1 and 2, the identified occupancy sequence 208 is compared to other occupancy sequences extracted from the table of past occupancy history 200 to find similar sequences (block 106). In the example shown, the five most similar occupancy sequences 210 are identified by comparison of the occupancy of corresponding time periods in the current day and past days, e.g. occupancy for a time slot from 10:00 to 10:15 in the identified occupancy sequence (e.g. for today) is compared to occupancy for time slots from 10:00 to 10:15 in the table of past occupancy (as compiled in block 102, e.g. for days in the past). In the example shown, sequences running from midnight to time t on previous days are compared to the current partial day 208 which also runs from midnight to time t.

It will be appreciated that identification of five similar sequences is shown in FIG. 2 by way of example only and in other examples N similar sequences may be found (e.g. the N most similar sequences). In another example, a set of similar sequences may be defined using a threshold of similarity and then either all sequences in the set or a subset (e.g. a subset of N sequences) may be used to compute an occupancy probability (in block 108). Where a subset is used, the subset may be selected at random, based on similarity (to achieve a subset of sequences which are most similar), with a preference for more recent days, e.g. such that a subset of N most recent sequences may be selected from the set of similar sequences (where each sequence in the set passes a similarity threshold), or based on other criteria. In a combination of such techniques, the N most similar sequences may be found using a weighting when computing similarity such that more recent sequences (e.g. sequences in past history which are closer to the current date) are more highly weighted than sequences which are further back in the past. In a further example, weights may be used within a sequence, e.g. a week long sequence from the table of past history may be used and time slots which are closer to the time which corresponds to the current time (i.e. the time at which the prediction is being made) may be weighted more highly. In such an example, data from six days ago may only really be relevant in performing the comparison where it is necessary to disambiguate between sequences that have identical matches in the period 0-5 days ago. In other examples, different criteria may be used to determine which sequences are given more weight than others.

In the example shown in FIG. 2, Hamming distances are used (in block 106) to compute similarity between the identified recent occupancy sequence 208 (from block 104) and the occupancy sequences extracted from the table of past occupancy 200 (as created in block 102). The Hamming distance counts the number of unequal corresponding binary vector elements (which corresponds to the number of time slots where the sequences do not match) and it can be seen that in the example shown in FIG. 2, two of the sequences extracted from the table of past occupancy have the same sequence as the current partial day (i.e. the sequence identified in block 104), such that their Hamming distance is zero and then the remaining sequences have Hamming distances in the range of one to five. In another implementation, the similarity may be measured in terms of the number of bit values which are in common, with sequences with the highest similarity values being selected. It will be appreciated that Hamming distances provide one example of a distance or similarity metric which may be used in performing the comparison and any reference to Hamming distances herein is by way of example only.

The use of corresponding time slots in FIG. 2 to perform the comparison is described by way of example only and in some examples, time shifting may be allowed, as can be described with reference to FIG. 3. The first example 301 in FIG. 3 does not include time shifting: the partial sequence 312 from recent history is compared directly to a corresponding sequence 314 from the table of past occupancy with slots at the same time of day being compared directly. The second example 302, however, uses time shifting such that although the partial sequence 312 is compared to a corresponding sequence 324 from the table of past occupancy, it is also shifted in time and compared to the sequence 324, as indicated by time shifted versions 326-332 of the partial sequence 312. In this example, the Hamming distances are shown inside squares and it can be seen that one of the time shifted versions 330 corresponds exactly to the historical sequence 324. In some examples, any amount of time shifting may be allowed and in other examples, the amount of time shifting used in the comparison (in block 106) may be limited (e.g. to +/−1 hour or +/−a defined number of time slots or may be shifted in a single direction in time only). Use of time shifting may enable the prediction method to accommodate situations where a person arrives home slightly later/earlier than usual and still use past data from 'normal' arrival times for performing the occupancy prediction.

Figure 3:
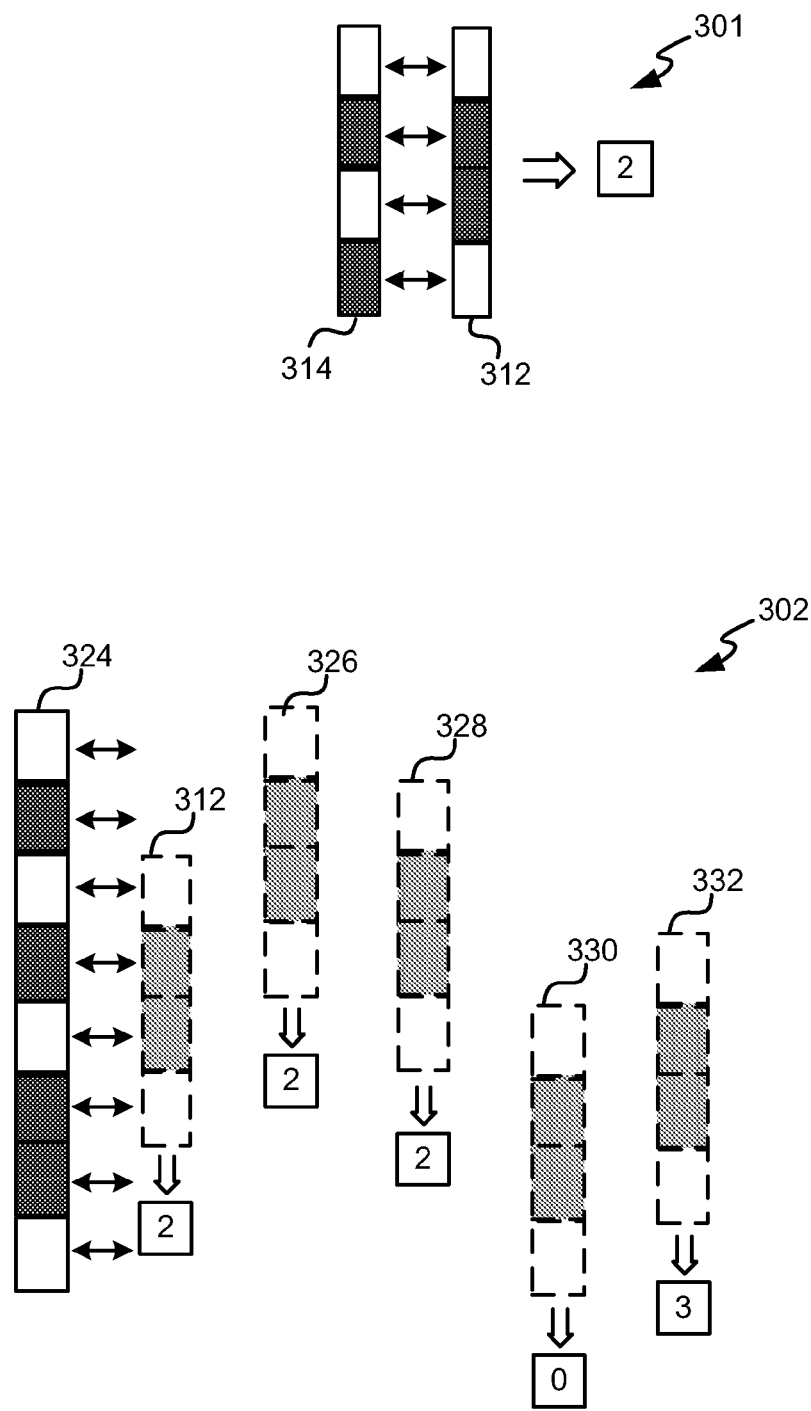
FIG. 3 is a graphical representation of the step of comparing occupancy patterns.

It will be appreciated that although FIG. 3 shows time shifting of the partial sequence 312 (which is the sequence over recent history, as identified in block 104), in other examples, it may be the sequences extracted from the table of past occupancy which are time shifted in order to perform the comparison.

In another example method of comparing sequences (in block 106), a "noisy match" of sequences may be performed where a transition between 0-1 or 1-0 is allowed to move by one position (i.e. one time slot, or alternatively another specified number of time slots) and still be considered a match (e.g. without incurring a penalty when computing a distance metric). In such an example, a sequence 00111 matches 00011 but not 00001 or 11111. This allows for schedules to drift slightly without penalizing the results of the comparison.

In a further example method of performing the comparison (in block 106), a lexical ordering of past sequences may be performed with a most recent bit first. The correct location of the recent history sequence (which may be referred to as a 'bitstring') may be found in that ordering. This has the effect of weighting recent history higher than more distant history.

When performing the comparison of the identified sequence with other sequences extracted from the table of past occupancy (in block 106), some implementations of the methods described herein may apply one or more matching restrictions to limit those sequences for which the comparison is performed (or to limit those sequences which are selected, e.g. to provide criteria to select the subset of sequences mention described above). Examples of matching restrictions which may be used include, but are not limited to:

- Only selecting historical data which is within a defined period of the current time (e.g. only going back one month, or one year, in the table of past occupancy). Where user patterns change, this restriction may improve the accuracy of the occupancy prediction (e.g. where a user starts job and so is now out of the house for the working day).
- For week days (Monday-Friday), only comparing the sequence over recent history with other week day data (i.e. other data for Mondays-Fridays) and/or similarly for weekend days (Saturday and Sunday), only comparing the sequence over recent history with other weekend data. This may improve accuracy of predictions where the behavior of users is significantly different during the working week (e.g. due to regular absences for school or work) compared to weekends.
- Limiting the comparison to past occupancy data for the same day of the week (e.g. to predict occupancy on a Tuesday, past data for Tuesdays only is considered). This may enable the occupancy predictions to accurately reflect regular activities (e.g. an evening class every Tuesday evening resulting in the home being unoccupied, unlike other evenings).
- Using external data to define a subset of past occupancy data for use in the comparison process, e.g. if today is a school holiday (which may be determined, for example, from an external data source such as a school's website or from a user's electronic calendar), comparing the sequence over recent history with data from previous days in school holidays. Again, this optimization may improve the accuracy of predictions where there is a different pattern of occupancy for particular times of year or periods of the year. In another example, if one occupant is shown away (e.g. on a business trip) by a data source such as an electronic calendar, the comparison may be performed using past occupancy data for days when that occupant was also away or if the calendar shows that a particular person is visiting (e.g. grandparents visiting), this may result in the comparison being performed using data from when they were previously visiting. This may, for example, improve the occupancy prediction accuracy because, for example, when the grandparents are visiting, the house is likely to be occupied during the working day, whereas when they are not visiting, the house is likely to be empty.

Exclusion of specific days or days which are considered anomalous for any reason, for example, public holidays may be excluded from the comparison when performing prediction for a non-public holiday (as described above, external data sources may be used in identifying such days to be excluded). In another example, a day where the house is not occupied at all may be excluded from the comparison or a day where the house is occupied all the time, as these may be considered to be outside the normal behavior for the occupants of the house (where the 'normal' behavior may be computed from the table of past occupancy using Hamming distances or learned from the table of past occupancy using machine learning techniques and may involve applying one of the matching restrictions detailed above). In a further example, days when visitors are staying in the house may be excluded (where this may be determined either from the occupancy data itself or from data such as an electronic calendar).

These example matching restrictions may be considered to be based on a characteristic of the time at which the prediction is being made (e.g. time of day, day of week, age of data etc) and/or a characteristic of the space at the time the prediction is being made (e.g. who is at home or who is visiting currently).

The above matching restrictions are described in terms of excluding some data when performing the comparison (i.e. filtering out data from the table of past history). In other examples, and as described above, weightings may be used which are not simply 1 (include) or 0 (exclude) and such weightings may be based on any combination of the criteria described above (e.g. weightings which are based on a characteristic of the time at which the prediction is being made and/or a characteristic of the space at the time the prediction is being made). The term 'filtering' when applied to the data in the table of past occupancy may be used to refer to including/excluding data and/or applying weightings to the data and a filter may be used which is based on a characteristic of the time at which the prediction is being made (e.g. time of day, day of week, age of data etc) and/or a characteristic of the space at the time the prediction is being made (e.g. who is at home or who is visiting currently).

In order to predict the occupancy of a single space (in block 108), the comparison (in block 106) may be performed based on occupancy data for that room or for a combination of rooms. In an example, using two rooms, the occupancy sequence over recent history may comprise a vector:

$$\begin{pmatrix} 1,0 \\ 1,1 \\ 0,1 \\ 0,0 \end{pmatrix}$$

where each element comprises two bits of data, one bit corresponding to the occupancy of each of the two rooms. This may be compared (in block 106) to the following past occupancy data (which may be specific table of past occupancy or a subset of the past occupancy data):

$$\begin{pmatrix} 1,0 & 0,0 & 1,1 & 0,1 \\ 1,1 & 1,0 & 1,1 & 0,0 \\ 1,1 & 1,1 & 0,1 & 0,1 \\ 0,0 & 0,1 & 0,0 & 0,0 \\ 0,1 & 0,1 & 0,0 & 0,0 \\ 1,1 & 1,1 & 0,0 & 0,0 \\ 1,1 & 1,0 & 0,1 & 0,1 \\ 1,1 & 0,0 & 0,1 & 0,1 \end{pmatrix}$$

where each column corresponds to a different set of past data from a different previous time. In this example, the Hamming distance can be generalized to count all the bit differences between corresponding pairs of bits, one bit corresponding to the occupancy of each of the two rooms. For example, the Hamming distance between the recent history vector and the first four entries of the first column of the previous times would be 1 since there is only one corresponding bit that is different. As an alternative, the Hamming distance may be incremented by one if either or both of a corresponding pair of bits is different. In this case, the Hamming distance between the recent history vector and the first four entries of the first column of the previous times would still be 1, but the Hamming distance between the recent history vector and the first four entries of the last column of the previous times would be 2, since there are two pairs that are different.

Where a combination of rooms is used, this may be considered an aggregate or composite space and the past occupancy data for the sub-spaces may be combined using any Boolean operator (e.g. AND, OR, XOR, NAND etc). Past occupancy of a combination of rooms may be used to predict the combined occupancy of the composite space or to predict the probability of one of the sub-spaces (as in the previous example). Similar techniques may be used where there is per-person occupancy sensing, such that occupancy prediction may be performed based on combinations of occupancy data for different people.

Figure 4:
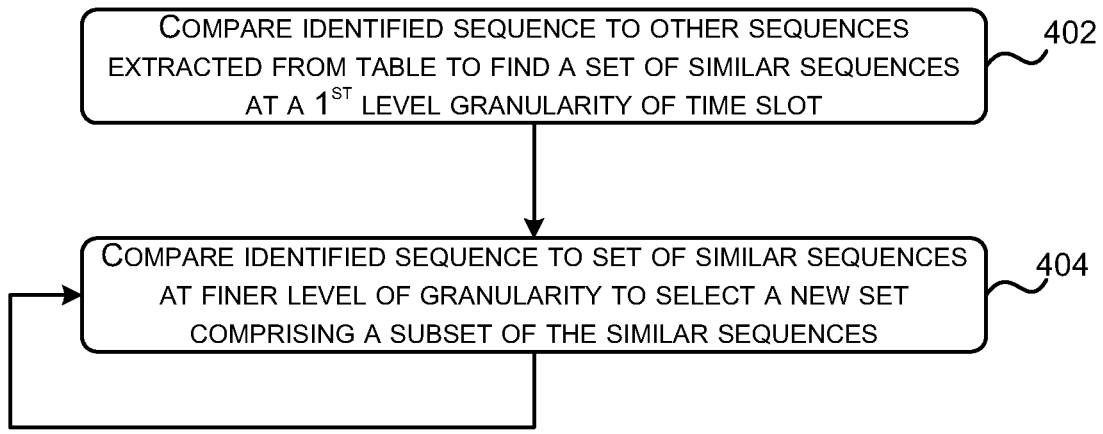
FIG. 4 is a flow diagram showing an example of one of the steps of the method of FIG. 1 in more detail.

As mentioned above, in some examples a progressive algorithm may be used to find similar sequences (in block 106) and an example of such a method can be described with reference to FIG. 4. A first comparison step is performed (in block 402) at a first level of granularity of time slot to identify a set of similar sequences. This set is then refined by one or more subsequent steps (block 404) in which a comparison is performed between the occupancy sequence over recent history (from block 104) and each similar sequence in the set using a finer level of granularity (i.e. shorter time slots). In an example, the initial set may be identified (in block 402) using 1 hour time slots and then the set may be refined, to generate a final set which is smaller than the initial set, using 30 minute and then 15 minute time slots.

Having identified one or more similar sequences using any combination of the techniques described above, an occupancy probability for the future 212 (i.e. for time after time t) can then be calculated using those identified similar occupancy sequences (block 108). In the example shown in FIG. 2, the prediction uses the average bit values in corresponding time slots in the similar sequences, such that in the first slot after time t, the computed occupancy probability is only 0.2 (i.e. only one of the five similar sequences 210 showed occupancy during the corresponding time slot) and in the fifth and sixth time slots after time t, there is a probability of 1.0, as all five similar sequences showed occupancy in the corresponding time slot.

Averaging the bit values provides just one algorithm that may be used to compute the occupancy probability. In another example, a weighted average may be used, with older sequences in the group of similar occupancy sequences being used for the computation being weighted less heavily than more recent sequences.

Using the methods described herein, predictions may be made as long into the future as desired as long as historical data covers the desired predictive time span. As described above, the similar sequences of past occupancy history which are identified (in block 106) may be augmented at the end of the day (e.g. by 4, 8 or 24 hours or much longer) to provide the required historical data and where sequences have a standard length (e.g. 24 hours or 28 hours), multiple sequences from the table of past history may be stitched together to provide the requisite historical data in order to perform the required prediction. The length of the prediction going forward in time may be a user specified variable or may be fixed within any system. In other examples, the length of the prediction going forward in time may be dynamically decided by the system, e.g. because it learns from past heating events that with the current house temperature and outside temperature, it will take up to X minutes to heat the house from cold, so it needs to predict X minutes ahead. The length of the prediction may also be linked to how often the prediction is updated (e.g. by using predictions which go further forward into the future where the gaps between updating predictions are increased or where there are no plans to repeat the prediction).

Figure 5:
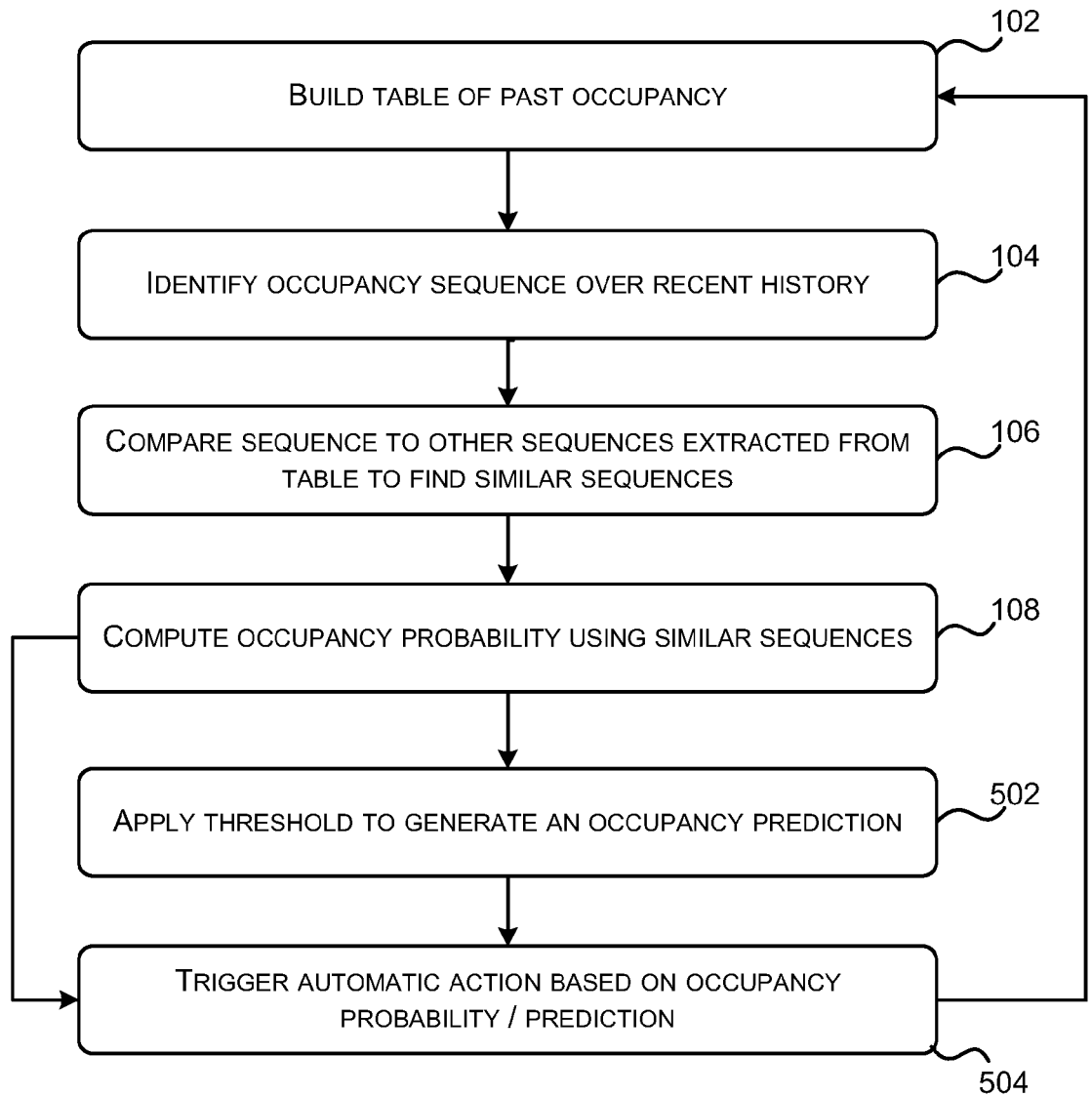
FIG. 5 is a flow diagram of an example method of triggering automated actions based on predicted occupancy of a building.

Once an occupancy probability has been computed, a threshold may be applied to provide a binary prediction that a space is going to be either occupied or not occupied (which may be referred to as an occupancy prediction) and this is shown in FIG. 5 (block 502). In an example, a threshold of 0.5 may be used (e.g. if probability >0.5 then space will be occupied). The threshold may be varied by a user to adjust the sensitivity of the prediction algorithm and any variation may be dependent upon the application for which the occupancy prediction is used. In an example, where the occupancy prediction is used to control a home heating (and possibly cooling) system, the threshold may be decreased where comfort is a priority (i.e. where it is preferable to be over optimistic about when a space may be occupied and heat the space accordingly than to have cold occupied space). In another example, where it may be more important to have confidence in any prediction that a space will be occupied (e.g. for energy saving in a home heating application), then the threshold may be increased above 0.5. In a further example, different thresholds may be used for different amounts of time into the future. For example, a threshold for the first 90 minutes into the future may be 0.5, but for 180 minutes might be 0.8 such that a more conservative approach is taken for more distant predictions.

As shown in FIG. 5, the occupancy prediction generated in block 108 (and to which a threshold may have been applied in block 502) may be used to trigger an automatic action (block 504). Examples of such automatic actions which may be triggered based on an occupancy prediction include, but are not limited to:

- Control of a heating and/or cooling system (e.g. switching heating on and off so that spaces are at the set point temperature only when it is predicted that they will be occupied so that energy is not wasted).
- Control of a water heating system (e.g. ensuring hot water available for when it is predicted that someone will be in the bathroom, or specifically washing)
- Control of a lighting system (e.g. switching lights off when it is predicted that a space will not be occupied)—this may be particularly applicable where low energy light bulbs (or similar) are used which have a significant warm-up time before they are at full brightness.
- Control of a security system (e.g. by automatically switching the system on/off, or changing alarm trigger conditions dependent upon the predicted occupancy).
- Scheduling tasks, such as tasks which are anti-social or resource consuming (e.g. noisy/smelly tasks, such as running a dishwasher or tumble dryer, can be scheduled for periods when the space is likely to be unoccupied) or tasks which are energy consuming (e.g. clothes in a tumble dryer need to be dry before a person arrives home such that occupancy prediction sets a deadline for scheduling the task but where energy costs vary across the day, this can also be taken into consideration, and similarly for electric vehicle charging, the vehicle needs to be charged before the next predicted departure from the home but there is some flexibility within this to select a time based on electricity rates).
- Turning appliances on or off, which may, for example, be a safety feature or for energy saving or where there is a significant turn-on (e.g. boot) time or warm-up time for an appliance (e.g. switch off lights, television etc when it is predicted that the space will be empty, turning on/off digital picture frames, locking and unlocking computing devices, logging users off and/or on, placing computing devices into a low power mode when no one is likely to be home to use them and returning them from such a mode in advance of a predicted arrival home, turning on a coffee machine "just in time" before predicted arrival home, booting/rebooting computing devices, satellite receivers, games consoles etc).
- Charging of electric vehicles (e.g. ahead of when it is predicted that someone will leave the building) or other vehicle related processes (e.g. pre-heating or pre-cooling vehicles or vehicle interiors, batteries or engines in harsh climates).
- Schedule shared transport options (e.g. if it is predicted that a user will leave home at a particular time in the future, transport options can be scheduled accordingly).
- Sending notifications (e.g. sending alerts to users of events at home when the house is not expected to be occupied).

The control of a device or system to switch on/off, change its set point or otherwise change its operating parameters, as described above, may be referred to as causing the device or system to change modes.

Where an automatic action is triggered (in block 504), aspects of the sensor data itself may be used in addition to the occupancy prediction in determining the automatic action itself or parameters associated with the automatic action. This sensor data may be historical sensor data or current sensor data. Furthermore, any system which is controlled on the basis of the occupancy prediction (e.g. a home heating application), may also use current sensor data to influence its operation. For example, if thermal cameras are used to detect occupancy and historical occupancy data generated from the camera data is used to predict future occupancy, as described above, current thermal camera data may also be used to control the set point of the heating system (e.g. if it is detected that an occupant is hot, the set point temperature of any thermostat may be reduced). In another example, where the historical occupancy data is generated using sensor data from a per-person sensor or a sensor that can provide an indication of the number of people present (even where this is an imprecise indication), the set point temperature of a home heating system (which is switched on/off based on the occupancy prediction, as described above) may be adjusted based on current numbers of occupants which are detected in the space. Where the occupancy prediction is used to warm a vehicle prior to a predicted departure, this may also be dependent on the number of people predicted to leave (e.g. heat the drivers seat only, heat both front seats, etc). In a further example, per-person sensor data and per-person prediction may be used to set personalized set points for a home heating/cooling system or other system (e.g. vehicle heating system).

Where the occupancy probability (rather than an occupancy prediction) is used (in block 504) to trigger an automatic action (i.e. the step of applying a threshold in block 502 is omitted), the probability itself may be used in determining the automatic action triggered or in setting parameters associated with the automatic action. For example, if the probability of occupancy is in a defined range (e.g. 0.4-0.6) such that the system is unsure whether a user will arrive home, the home may be heated a little (e.g. to a reduced set point temperature but above ambient) so that in the situation where a user does arrive home, they are not too cold (and it will reduce the time taken to heat to a standard set point temperature).

Different applications may use different occupancy prediction methods selected from the variations described herein. For example, some applications may use a whole house approach (e.g. either a single sensor for the whole house or if any part of the house is occupied, the house is considered occupied) while other applications may be on a per-space basis or be based on a combination of spaces within a house (e.g. any bathroom). In addition, as described above, some of the automatic actions may rely upon per-person occupancy prediction (i.e. a prediction in relation to a particular user). In other cases, the number of people in a space may be taken into consideration, e.g. if a space is predicted to be occupied by a large number of people there may be less requirement to heat the space than if it is predicted to be occupied by just a few people.

Experimental results from using the occupancy prediction method described herein to control a home heating demonstrate that an improvement in the trade off between energy consumption (gas consumption in the tests performed) and MissTime—the amount of time someone was home and the house was not warm—can be achieved. In the study performed, the occupancy prediction methods were used in five family homes. In three of the homes, occupancy was detected on a whole-house basis using active RFID tags and the occupancy prediction was used to control whole-house forced air heating systems. In these homes, a similar amount of gas was used but the MissTime was reduced by a 6× to 12× factor. In the remaining three homes, occupancy was detected on a per-room basis and the resulting prediction was used to control radiators and underfloor heating per room (i.e. per-room heating control). In these homes, improvements in both gas consumption and MissTime were achieved.

Although the methods described above generate an occupancy prediction (in block 108), the methods may also be used to generate other predictions dependent on the sensor data obtained. For example, if the sensors detect the proximity of a user or a portable device carried by a user to a sensor, the table generated in an equivalent step to block 102 may instead be a table of past proximity and in many instances, the sensors described above rely on a proximity measurement to determine occupancy. The method may then be modified to generate a proximity sequence over recent history in an equivalent step to block 104, and then the table and sequence may be used (in an equivalent to block 106) to find similar proximity sequences for use in computing a proximity probability (in an equivalent step to block 108). In other examples, the methods may be used to generate predictions based on any state that can be measured: driving, sleeping, shopping, using the telephone, etc.

Figure 6:
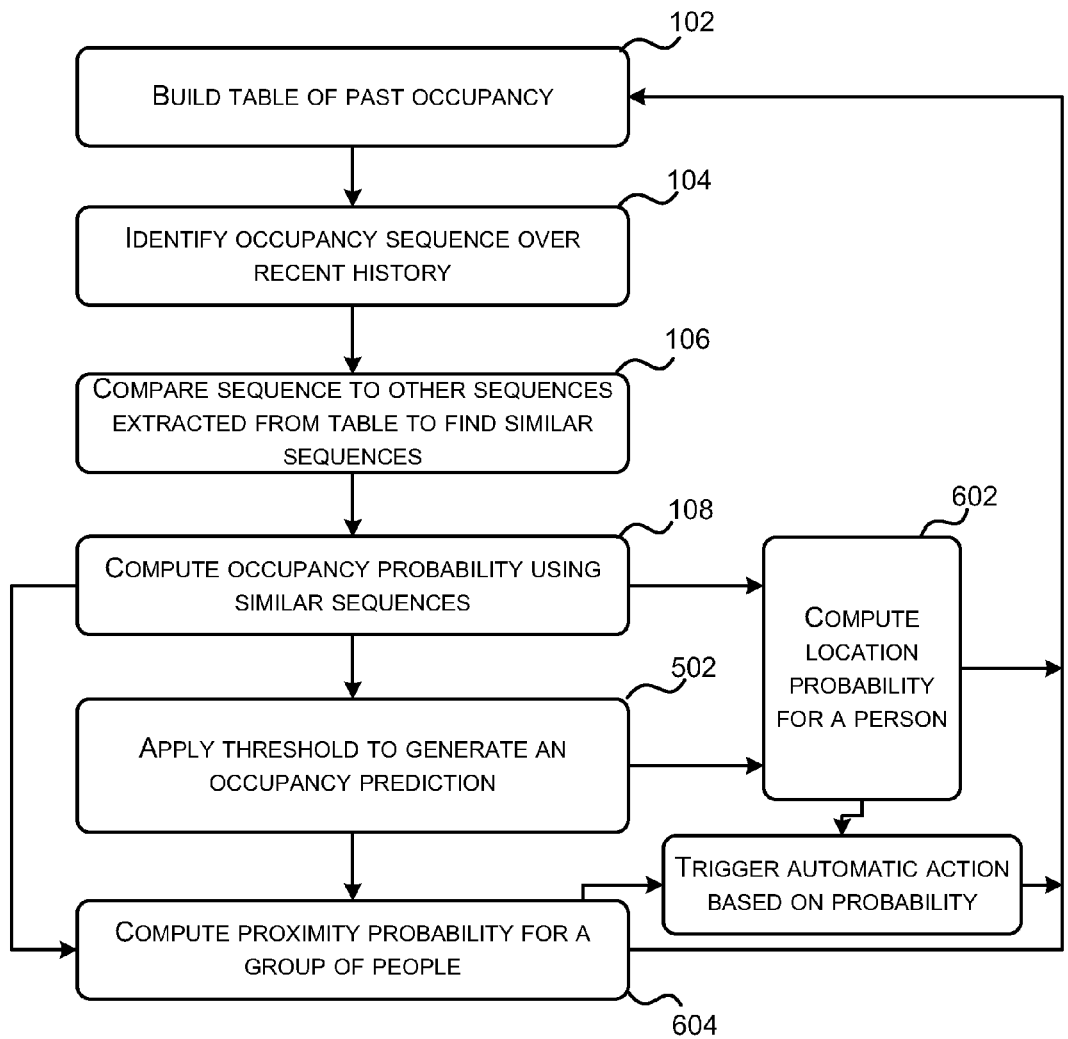
FIG. 6 is a flow diagram of another example method of occupancy prediction in which the occupancy prediction is performed on a per-person basis and the results are then used to generate additional predictions of user activity

FIG. 6 shows another example method of occupancy prediction in which the occupancy prediction is performed on a per-person basis and the results are then used to generate additional predictions of user activity. In a first example, the per-person occupancy predictions may be used to generate location probabilities for a person (block 602), e.g. in a particular time slot, person A is most likely to be in space B. This prediction may be generated by considering the per-person occupancy prediction for the time slot and person A and then selecting the space with the highest probability of occupancy. There are many example applications for the generated location probability for a person and examples include those listed above in relation to occupancy prediction and others including routing of messages to the appropriate location, in particular where the messages are scheduled ahead of time (e.g. reminder messages, advertisements, warnings, opportunities, events, etc). setting of preferred lighting scenes, playing of preferred types of background music etc. In a second example, the per-person occupancy predictions may be used to generate proximity predictions for groups of two or more people (block 604). For example, the proximity predictions may predict when person A and person B are next likely to be in the same place. As before, there are many applications for such prediction data such as scheduling of meetings, predicting catering requirements etc.

The methods shown in FIGS. 1, 5 and 6 may be repeated periodically to update the occupancy prediction. For example, as the time progresses such that the current time enters a new time slot, an additional time slot of occupancy data is added to the sequence over recent history which is identified in block 104 and therefore there may be a longer sequence with which to perform a comparison to past occupancy data in block 106. In other examples, the occupancy predictions may be updated less frequently, e.g. once or twice a day, or when a specific trigger is received (e.g. upon user input).

In the examples described above, the bit value associated with each time slot is a binary value and in some cases may comprise multiple binary values (e.g. for combinations of spaces). However, in other examples the value associated with a time slot may not be zero or one but any measure of the occupancy during the time slot and may be in the form of an integer, fraction, floating point number, real number, probability etc. In an example, it may be a proportion of the time slot when the room was occupied (e.g. 0.8 if the room was occupied for ⅘ of the length of the time slot) or indicate the uncertainty in the occupancy data (e.g. if a sensor was unavailable, the occupancy may be 0.5). In another example, the value may represent the number of occupants detected during that time slot (e.g. a value of 3 indicating that 3 people were in the space during the time slot). In a further example, the raw number of events detected by a sensor in a time slot may be recorded. For motion sensors, for example, this would enable differentiation of periods of high activity within a space (e.g. when someone was awake and moving around) from periods of lower activity (e.g. when a person was asleep in the room) and this may provide additional detail which improves the accuracy of any predictions made. Instead of applying Boolean operators to such non-binary values, other arithmetic operations may be used (e.g. take smaller, take larger etc). In such examples, a distance metric may still be used in performing the comparison and these non-binary values may also be averaged in order to compute the occupancy probability (in block 108) or alternative algorithms (e.g. weighted averages) may be used.

Figure 7:
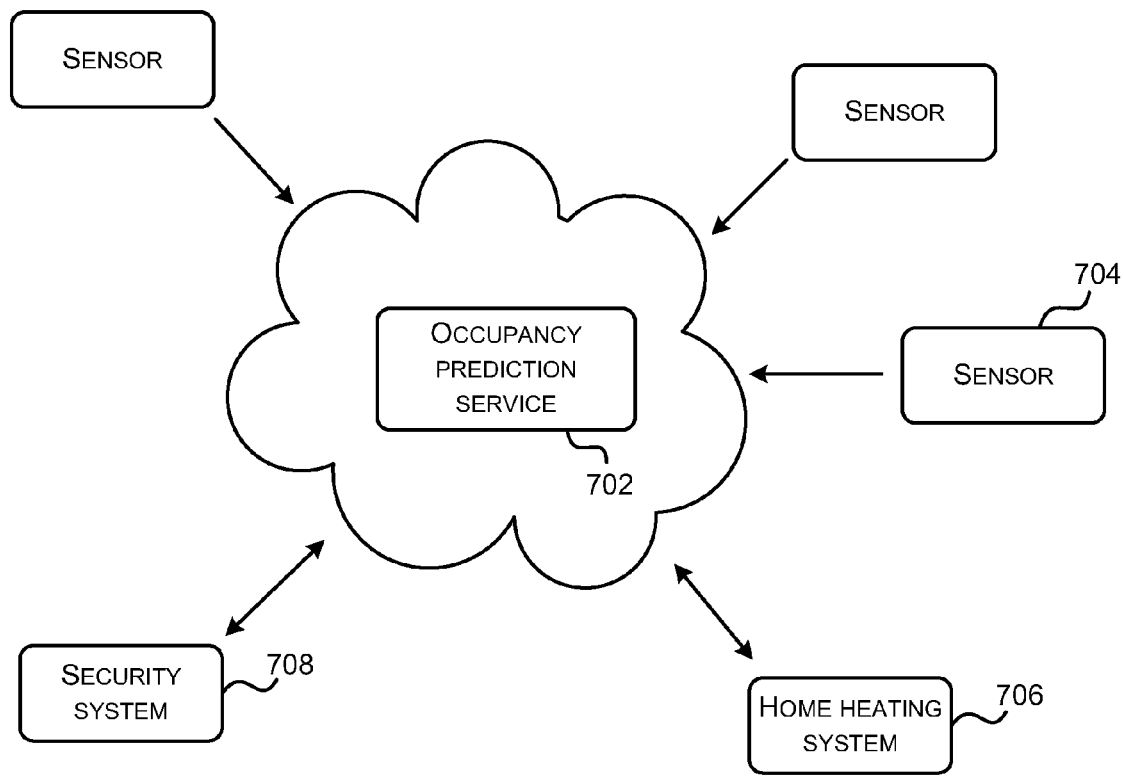
FIG. 7 is a schematic diagram of a cloud based service which implements an occupancy prediction method.

The methods described above may be implemented in different ways. In a first example, a central entity such as a home computing device (e.g. a home PC or home server) may implement the method and perform occupancy prediction for all of the spaces or for a number of the spaces. In an implementation, the methods may run on a virtual PC running in RAM on such a central entity. In another example, as shown in FIG. 7, the central entity which performs the method for a number of spaces may be a cloud based service 702 which collects the sensor data (from sensors 704) and performs the occupancy prediction using this data. One or more systems that use the occupancy prediction, such as a home heating system 706, home security system 708, etc can then either query the service 702 for occupancy prediction data or receive data sent to them by the service 702. Where a single computing device performs the occupancy prediction for more than one space, the methods described above may be implemented on a GPU (graphics processing unit) such that computations for different spaces can run in parallel. In another example, a central entity may not be used to perform occupancy prediction but instead occupancy prediction may be performed locally within the particular space. In such an example, a small computing device may be located within the space and in some examples may be mounted within a common housing with the sensor, and may perform occupancy prediction. Where the occupancy prediction is used to control a local system (e.g. a radiator valve, light, heater or air-conditioning unit within the space), the computing device may then send control signals to the local system. Alternatively, the computing device may send messages to a central system which uses the occupancy prediction for the space in some way or may send the computed occupancy prediction to a central entity (e.g. to a cloud based service or home server) which then disseminates the data in some way. In a further example, a mobile device (or collection of mobile devices) may perform the sensing and in some instances the computation of the occupancy probability/prediction. In such an instance, the home may be considered as a set of remotely actuatable elements (and/or sensing elements) for the mobile device(s) of the multiple inhabitants.

Figure 8:
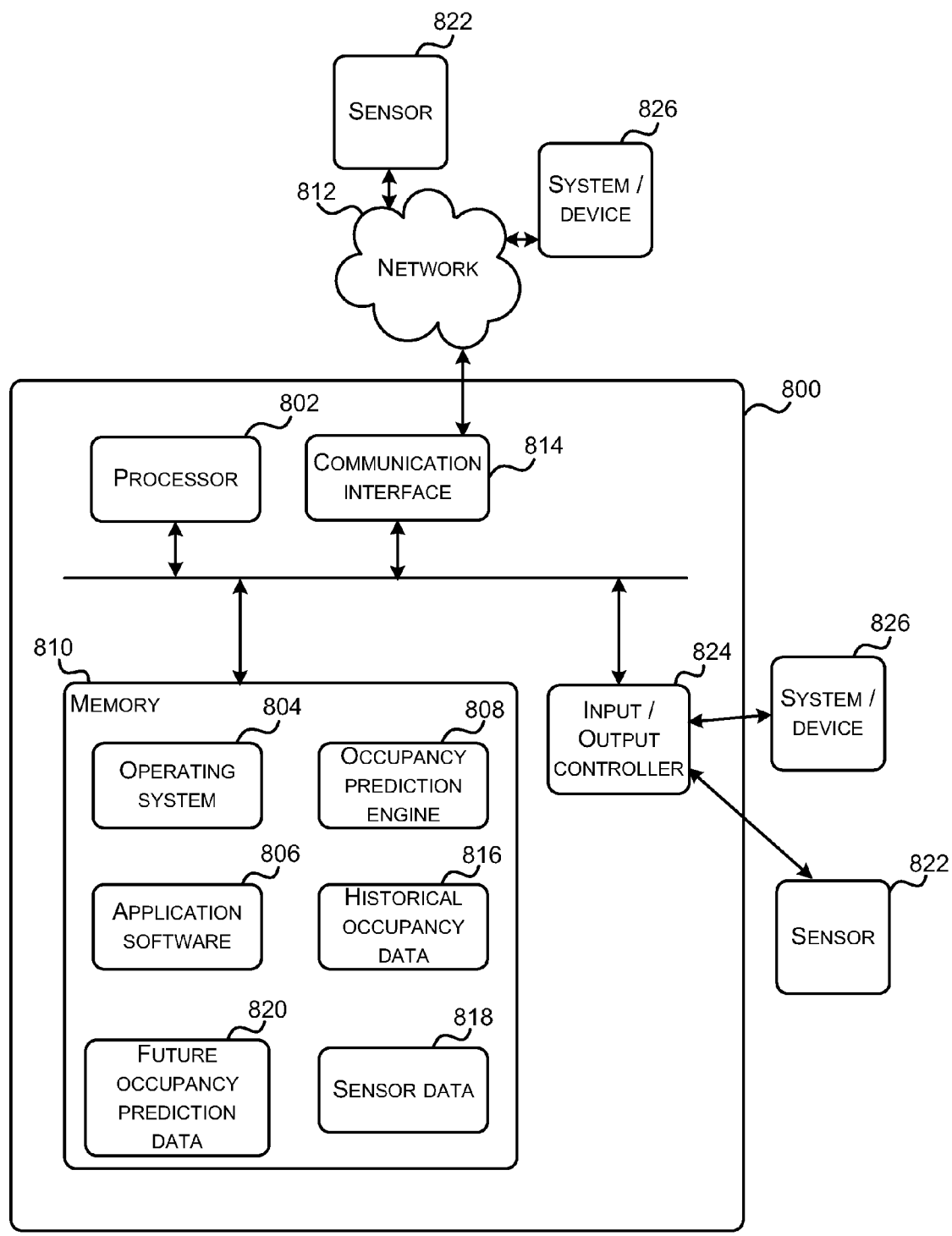
FIG. 8 illustrates an exemplary computing-based device in which embodiments of the occupancy predictions methods may be implemented.

FIG. 8 illustrates various components of an exemplary computing-based device 800 which may be implemented as any form of a computing and/or electronic device, and in which embodiments of the occupancy prediction algorithm described above may be implemented. As described above, this device 800 may be located within the home (e.g. as a home PC or home server), within the cloud, or elsewhere and in one example it may be co-located with sensors which are used to detect occupancy.

Computing-based device 800 comprises one or more processors 802 which may be microprocessors, controllers or any other suitable type of processors for processing computer executable instructions to control the operation of the device in order to compute occupancy predictions based on past occupancy patterns. In some examples, for example where a system on a chip architecture is used, the processors 802 may include one or more fixed function blocks (also referred to as accelerators) which implement a part of the method of predicting occupancy in hardware (rather than software or firmware). Furthermore, as described above, the processor may be a GPU. Platform software comprising an operating system 804 or any other suitable platform software may be provided at the computing-based device to enable application software 806 and an occupancy prediction engine 808 to be executed on the device.

The computer executable instructions may be provided using any computer-readable media that is accessible by computing based device 800. Computer-readable media may include, for example, computer storage media such as memory 810 and communications media. Computer storage media, such as memory 810, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. The memory 810 may further be used to store historical occupancy data 816 and in some cases, the sensor data 818 itself may be stored. Occupancy predictions 820 may also be stored in the memory 810 in some implementations.

Although the computer storage media (memory 810) is shown within the computing-based device 800 it will be appreciated that the storage may be distributed or located remotely and accessed via a network 812 or other communication link (e.g. using communication interface 814). Although only a single connection to a network 812 is shown, it will be appreciated that there may be multiple connections to different networks and as a result there may be one or more communication interfaces and these may use different communications protocols to communicate (e.g. a wired interface and a wireless interface, or multiple wireless interfaces using different protocols).

The computing-based device 800 may receive data from sensors 822 directly (e.g. via an input/output controller 824) or via a network 812 (via the communication interface 814). This input/output controller 824 may be further arranged to output trigger or control messages (e.g. in block 504 in FIG. 5 or 6) to systems or devices 826. Such messages may, in addition or instead, be sent over the network 812 to such a system or device 826. The input/output controller 824 may further be arranged to output display information to a display device (not shown in FIG. 8) which may be separate from or integral to the computing-based device 800 and which may provide a graphical user interface. The input/output controller 824 may also be arranged to receive and process input from one or more devices, such as a user input device (e.g. a mouse or a keyboard, also not shown in FIG. 8). In an embodiment the display device may also act as the user input device if it is a touch sensitive display device. The input/output controller 824 may also receive data from or output data to other devices.

The occupancy prediction methods described above provide an automatic method which is easy to implement and through use of quantization, enables computation of occupancy predictions to be performed in real time. The end result provides a more accurate occupancy prediction than would be provided manually be the occupants themselves and without requiring user input. The system described is more dynamic and accurate than use of an electronic calendar alone to determine occupancy.

Although the present examples are described and illustrated herein as being implemented in a home system or a cloud based system, the systems described are provided as examples and are not intended to be limiting. As those skilled in the art will appreciate, the present examples are suitable for application in a variety of different types of computing systems and may be implemented to perform occupancy prediction in various environments for many different applications.

In the description above, the term 'user' is used to refer to any person that interacts with the occupancy prediction system described. They may be an active user (i.e. they know that they are interacting with the system) or a passive user (i.e. they are unaware that they are interacting with the system). The terms 'person' and 'occupant' are used interchangeably with 'user'.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method comprising:
receiving sensor data;
creating a table of past occupancy based on the sensor data;
identifying a sequence of occupancy data for a space for an elapsed portion of a current calendar day and a portion of a day immediately prior to the current calendar day divided into discrete time slots;
comparing the identified sequence to portions of sequences of occupancy data extracted from the table of past occupancy for the space to select one or more similar sequences, the portions of sequences of occupancy data extracted from the table of past occupancy for the space being selected using a progressive algorithm, each sequence of occupancy data extracted from the table of past occupancy relating to a calendar day and a portion of a previous calendar day divided into discrete time slots, use of the progressive algorithm comprising conducting a first comparison at a first level of granularity to identify a set of similar sequences and then conducting at least a second comparison against the set of similar sequences at a second level of granularity, the second level of granularity being a shorter time increment than the first level of granularity;
computing a future occupancy probability for the space based on the selected one or more similar sequences; and
sending a control message to operate a system based on the future occupancy probability for the space.

2. A method according to claim 1, further comprising:
triggering an automatic action based on the computed occupancy probability for the space.

3. A method according to claim 2, wherein triggering an automatic action comprises:
sending a control message to cause a system or device to change modes based on the computed occupancy probability for the space.

4. A method according to claim 1, wherein creating a table of past occupancy based on the sensor data comprises:
recording a value indicating if the space was occupied for each of a plurality of discrete time slots.

5. A method according to claim 4, wherein comparing the identified sequence to portions of sequences of occupancy data extracted from the table of past occupancy for the space to select one or more similar sequences comprises:
excluding anomalous days from the portions of sequences of occupancy data extracted from the table of past occupancy for the space; and
comparing a value in each time slot in the identified sequence with values in corresponding time slots in portions of sequences of occupancy data extracted from the table of past occupancy for the space to select one or more similar sequences.

6. A method according to claim 5, wherein the one or more similar sequences are selected based on a distance metric between the identified sequence and each of the portions of sequences of occupancy data extracted from the table of past occupancy.

7. A method according to claim 5, wherein comparing the identified sequence to portions of sequences of occupancy data extracted from the table of past occupancy for the space to select one or more similar sequences further comprises:
creating a time shifted version of the identified sequence; and
comparing a bit value in each time slot in the time shifted version of the identified sequence with bit values in time slots in portions of sequences of occupancy data extracted from the table of past occupancy for the space to select one or more similar sequences.

8. A method according to claim 5, wherein computing a future occupancy probability for the space based on the selected one or more similar sequences:
for each future occupancy probability, computing an average of values in corresponding time slots in each of the selected one or more similar sequences.

9. A method according to claim 1, wherein the method further comprises:
filtering the sequences of occupancy data extracted from the table of past occupancy used in the comparing step using a filter based on at least one of: a characteristic of the future time and a characteristic of the space at the future time.

10. A method according to claim 1, wherein the table of past occupancy comprises data for a plurality of spaces and wherein creating a table of past occupancy based on the sensor data comprises:
for each space, recording a value indicating occupancy for each of a plurality of discrete time slots.

11. A method according to claim 10, wherein the identifying, comparing and computing steps are performed for a composite space comprising a combination of at least two of a plurality of spaces.

12. A method according to claim 1, further comprising:
applying a threshold to the computed occupancy probabilities.

13. A method according to claim 1, wherein the table of past occupancy comprises per-person occupancy data for one or more people and wherein the identifying and comparing steps are performed using data for a particular person such that the occupancy probability for the space comprises an occupancy probability for the particular person in the space.

14. A method according to claim 1, wherein each sequence of occupancy data extracted from the table of past occupancy comprises occupancy data for a calendar day augmented with additional data from a portion of a previous day and wherein the sequence of occupancy data for a space for a period of time prior to a time t comprises occupancy data for a current calendar day prior to time t augmented with additional occupancy data from a portion of a day directly prior to the current calendar day.

15. A method according to claim 14, wherein each sequence of occupancy data extracted from the table of past occupancy comprises occupancy data for a calendar day augmented with additional data from both a portion of a subsequent day and a portion of a previous day.

16. A system comprising:
at least one sensor arranged to detect occupancy of a space;
at least one memory arranged to store data collected by the at least one sensor; and
at least one processor arranged to perform steps comprising:
creating a table of past occupancy based on the sensor data;
identifying a sequence of occupancy data for the space for an elapsed portion of a current calendar day and a portion of a day immediately prior to the current calendar day divided into discrete time slots;
comparing the identified sequence to portions of sequences of occupancy data extracted from the table of past occupancy for the space to select one or more similar sequences, the portions of sequences of occupancy data extracted from the table of past occupancy for the space being selected using a progressive algorithm, each sequence of occupancy data extracted from the table of past occupancy relating to a calendar day and a portion of a previous calendar day divided into discrete time slots, use of the progressive algorithm comprising conducting a first comparison at a first level of granularity to identify a set of similar sequences and then conducting at least a second comparison against the set of similar sequences at a second level of granularity, the second level of granularity being a shorter time increment than the first level of granularity;
computing a future occupancy probability for the space based on the selected one or more similar sequences; and
sending a control message to operate a system based on the future occupancy probability for the space.

17. A system according to claim 16, further comprising:
generating an occupancy prediction for the space and the future time interval by applying a threshold to the occupancy probability.

18. A system according to claim 16, further comprising:
sending a control message to a system associated with the space based on the generated occupancy probability.

19. One or more device-readable media, the device-readable media being hardware, with device-executable instructions that, when executed by a computing system, direct the computing system to perform steps comprising:
creating a table of past occupancy based on sensor data;
identifying a sequence of occupancy data for a space for an elapsed portion of a current calendar day and a portion of a day immediately prior to the current calendar day divided into discrete time slots;
comparing the identified sequence to portions of sequences of occupancy data extracted from the table of past occupancy for the space to select one or more similar sequences, the portions of sequences of occupancy data extracted from the table of past occupancy for the space being selected using a progressive algorithm, each sequence of occupancy data extracted from the table of past occupancy relating to a calendar day and a portion of a previous calendar day divided into discrete time slots, use of the progressive algorithm comprising conducting a first comparison at a first level of granularity to identify a set of similar sequences and then conducting at least a second comparison against the set of similar sequences at a second level of granularity, the second level of granularity being a shorter time increment than the first level of granularity;

computing a future occupancy probability for the space based on the selected one or more similar sequences; and sending a control message to operate a system based on the future occupancy probability for the space.

20. One or more device-readable media according to claim 19, wherein:

the table of past occupancy comprises discrete occupancy data for one or more people, the sequence of occupancy data for a space for an elapsed portion of a current calendar day and a portion of a day immediately prior to the current calendar day divided into discrete time slots comprises occupancy data for one of said people;

the comparison is performed using sequences of occupancy data for that person extracted from the table of past occupancy, such that the computed future occupancy probability for the space relates to that person; and wherein the control message is also based on a personal preference of that person.

* * * * *